United States Patent [19]
Silverbrook

[11] Patent Number: 5,420,966
[45] Date of Patent: May 30, 1995

[54] METHOD AND APPARATUS FOR FILLING AN OBJECT BASED RASTERIZED IMAGE

[75] Inventor: Kia Silverbrook, Woollahra, Australia

[73] Assignees: Canon Information Systems Canon Kabushiki Kaisha, Tokyo, Japan; Research Australia Pty Limited, NSW, Australia

[21] Appl. No.: 53,212

[22] Filed: Apr. 28, 1993

[30] Foreign Application Priority Data

Apr. 29, 1992 [AU] Australia ............................ PL2148

[51] Int. Cl.⁶ .............................................. G06F 15/62
[52] U.S. Cl. ............................................... 395/122
[58] Field of Search ............... 395/133, 134, 140, 122, 395/121; 345/113, 114, 118, 120, 121

[56] References Cited

U.S. PATENT DOCUMENTS 5,129,051 7/1992 Cain ..................................... 395/133

FOREIGN PATENT DOCUMENTS 0437277 7/1991 European Pat. Off. .
83-02510 7/1983 WIPO .
91-14995 10/1991 WIPO .

OTHER PUBLICATIONS

"The Edge Flag Algorithm—A Fill Method for Raster Scan Displays", Ackland, et al., IEEE Transactions on Computers, vol. 30, No. 1, Jan. 1981, pp. 41–48.

Primary Examiner—Phu K. Nguyen
Attorney, Agent, or Firm—Fitzpatrick, Cella, Harper & Scinto

[57] ABSTRACT

A system for filling at least one of a plurality of different object based rasterized images includes comparing each pixel position along a raster line with pixel edge intersection data of the plurality of different objects to determine if an edge exists at the pixel position, comparing, in the case no edge exists, a next pixel along the raster line while maintaining a currently displayed pixel fill level, and selecting fill level data for each possible one of the plurality of different objects to be represented at the pixel having an edge. A priority fill level of each of the plurality of different objects is determined based on the selected fill level data and one of the plurality of the different objects having the highest priority fill level data is displayed as the current pixel fill level.

9 Claims, 3 Drawing Sheets

METHOD AND APPARATUS FOR FILLING AN OBJECT BASED RASTERIZED IMAGE

BACKGROUND

1. Field of the Invention

The present invention relates to object based graphics systems, and, in particular, discloses a method and apparatus for providing hidden surface removal by filling an object based rasterised image prior to displaying that image either on a video display or by means of printing.

2. Description of the Related Art

Most object based graphics systems utilise a frame store or page buffer to hold a pixel based image of the page or screen. The outlines of the objects are calculated, filled and written into the frame store. For two-dimensional graphics, objects which appear in front of other objects are simply written into the frame store after the background object, thereby replacing the background on a pixel-by-pixel basis. This is commonly known in the art as "Painter's algorithm". Images are calculated in object order, from the rearmost object to the foremost object. However, real-time image generation for raster displays requires the calculation of images in raster order. This means that each scan-line must be calculated as it is reached, thus requiring that the intersection points of each scan line with each object outline are calculated and then subsequently filled.

Although it is possible, with a line buffer rather than a page buffer, to use the Painter's algorithm within a scan-line to fill the objects, image generation in real-time, at video data rates is expensive using this method.

SUMMARY OF THE INVENTION

It is an object of the present invention to substantially overcome the abovementioned difficulties through provision of a means by which overlying objects in an image can be filled on a line-by-line basis, without the need for a frame or line store.

In accordance with one aspect of the present invention there is disclosed a method of filling an object based rasterised image, said method comprising the steps of:

(a) comparing a pixel position in a raster line with pixel edge intersection data of a plurality of different objects to determine if an edge exists for said pixel position, (b) if not, moving to the next pixel position whilst maintaining a currently displayed pixel fill level, (c) if so, fill level data is selected for each possible one of said objects able to be represented by said pixel, and (d) the highest priority fill level data is displayed as the current pixel fill level.

In accordance with another aspect of the present invention there is disclosed apparatus for filling an object based rastefised image, said apparatus comprising:

comparator means for comparing a pixel position in a line of said rasterised image with a pixel position of an edge intersection of a plurality of different objects to determine if an edge exists at said pixel position;

selector means for selecting fill level data for each possible one of said objects able to be represented by said pixel; and a priority encoder means for determining the highest priority fill level data and displaying same as the current pixel fill level.

BRIEF DESCRIPTION OF THE DRAWINGS

A preferred embodiment of the present invention will now be described with reference to the-drawings in which.

DETAILED DESCRIPTION OF THE PREFERRED EMBODIMENT

Figure 1:
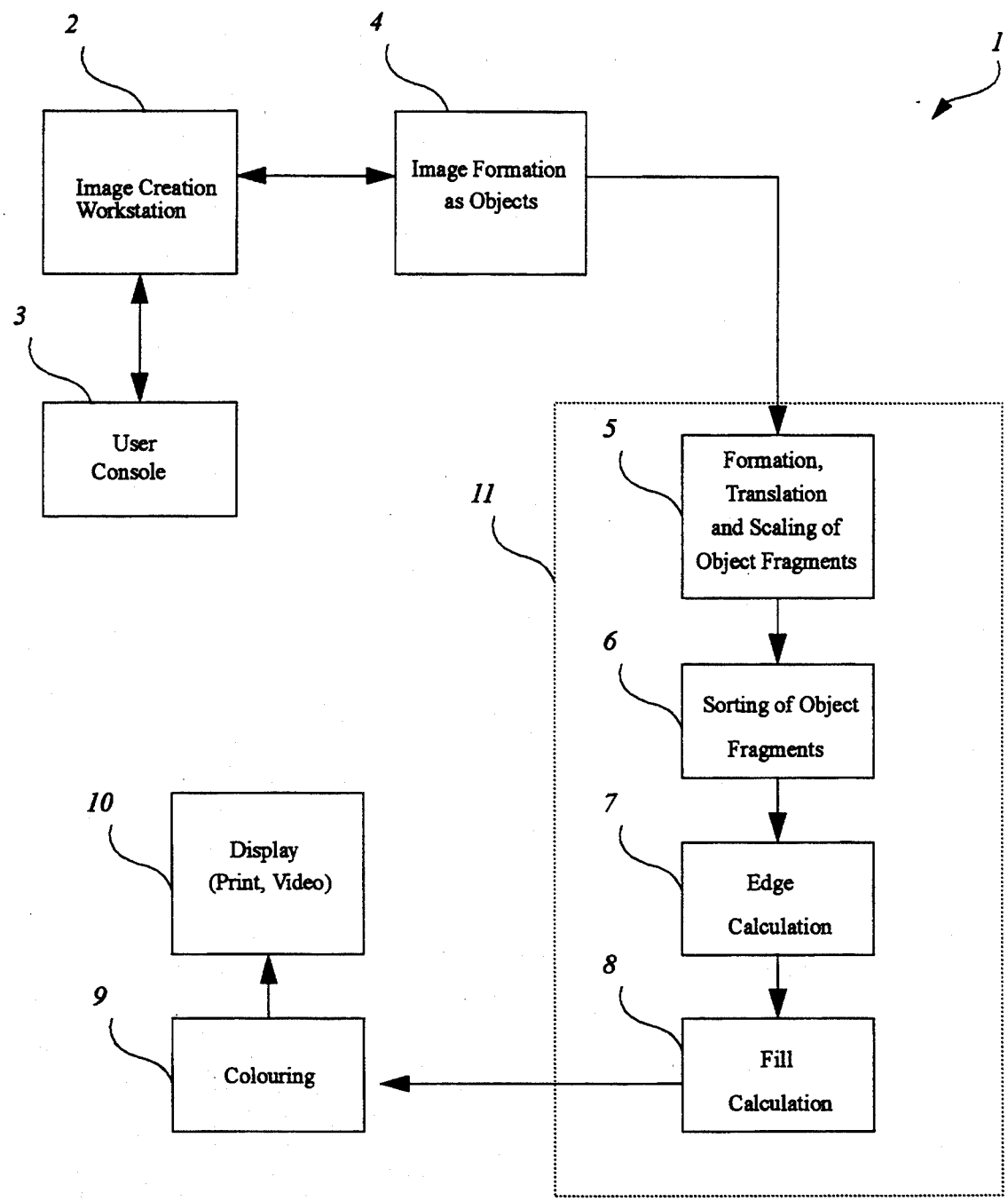
FIG. 1 is a schematic block diagram representation of an object based graphics system which includes the preferred embodiment.

Referring firstly to FIG. 1, a data flow diagram of a real time object based graphic system 1 is shown which is characterised by the absence of an image frame store. The system 1 generally includes an image creation workstation 2 which permits a user to select various images either using a drawing tablet, image scanner, database of images, or the like. The user can input specific commands via a command console 3 to a processor 4 which acts to divide the images into objects and to create a page display list of those objects.

As indicated earlier, where an image frame store is available, the objects need only be stored in the frame store on a one-by-one basis so to form the entire image. However, in real time image generation, the processing required to calculate, store, as well as overwrite pixel data within such a memory is excessive and therefore not suitable for low cost systems.

Specifically, it is required that each of the objects of the final image be processed on a line-by-line basis. This is performed initially by forming, translating and scaling of portions of the objects (object fragments) 5 for each object of the image. The various sub-objects are then sorted 6 into the order into which they will appear in each raster line of the display. Edge calculation 7 then occurs which determines the intersection between all object fragments of the image such that the image need only be represented by edge pixel dam, and the colour level into which the image changes after crossing each edge. This data is then output to a fill calculator 8 which, using the edge pixel data and the colour level, and in synchronisation with a display 10, outputs pixel level data for each pixel of the raster line for the image. This pixel level data is then input to a colouring device 9 which outputs specific colour information either in RGB (red, green, blue) or CYMK (cyan, magenta, yellow and black) or other colour data formats to an image display 10 such as a video display or a printer respectively.

As illustrated in FIG. 1, the data flow stages 5, 6, 7, and 8 can be combined into a single real time objects graphics processor 11 such as that disclosed in U.S. patent application Ser. No. 08/053,373, filed Apr. 28, 1993, entitled "A Real-Time Object Based Graphics System", claiming priority from Australian Patent Application No PL2147 of 29 April, 1993, lodged concurrently herewith and the disclosure of which is hereby incorporated by reference.

FIGS. 2 to 6 show the image generation process, termed rasterization just described. In this case, an image 12 is formed by a background 13 which acts as a first object, a character "A" 14 which acts as a second object, a rectangle 16 which acts as a third object, and a circle 15 which acts as a fourth object.

Figure 2:
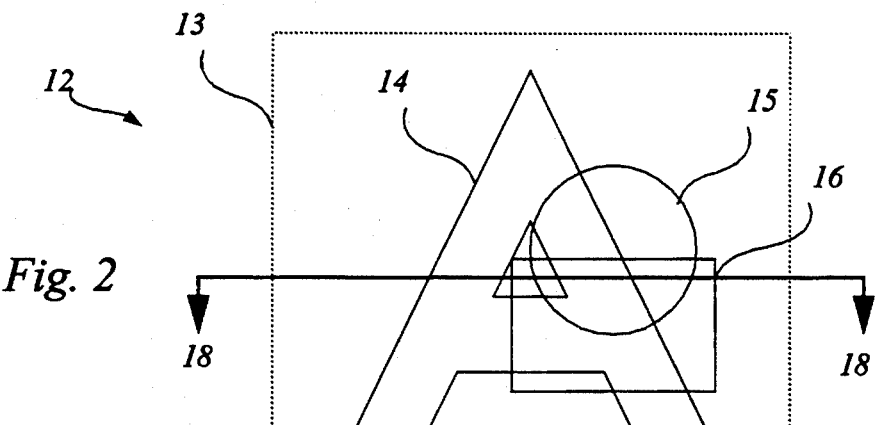
FIG. 2 illustrates the outlines of an image formed of a number of objects.

FIG. 2 shows the outline information of the image 12 which is a series of numbers which describe each fragment of the outline of the curves and the priority level of each curve fragment. The priority level is analogous to the level each object takes in the resultant image and the manner in which the objects overlie each other. This complements the arrangement obtained through the use of Painter's algorithm. Also seen in FIG. 2 is a sectional line 18—18 representing a single scan-line which is used with reference to FIGS. 3, 4 and 5.

Figure 3:
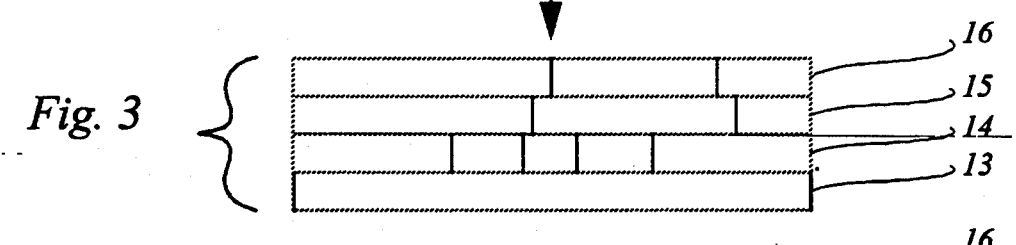
FIG. 3 illustrates the image of FIG. 2 when viewed in priority order.

As seen in FIG. 3, edge calculation of the intersection of each scan line with the outline fragments to be rendered is involved. This results in a sorted list of the pixel position of each fragment intersection, along with the priority level. FIG. 3 shows a cross-section through the line 18—18 of FIG. 2 which represents a single scan line of the image and in which the priority level is represented by the height of each of the layers in FIG. 3.

Figure 4:
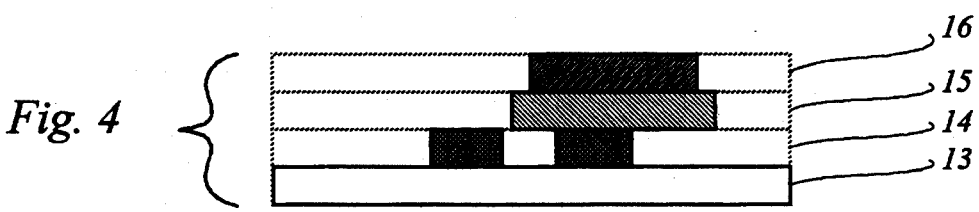
FIG. 4 is a view similar to FIG. 3, in which each of the objects is fully coloured.

In FIG. 4, the regions to be filled are generated. These regions are filled by the "even/odd rule". This involves, where the first intersection encountered turns the fill of colour ON, the second intersection turns the fill OFF, and third turns the fill ON and so on. This fill method allows holes in objects, such as in the character A 14, to allow the background 13 to appear there through.

Figure 5:
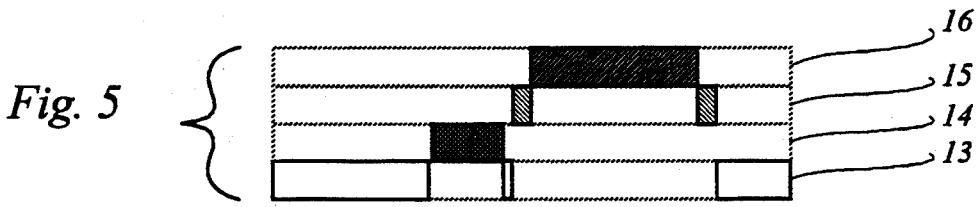
FIG. 5 is a view similar to FIG. 4 after hidden surfaces are removed.

Next, as seen in FIG. 5, hidden surfaces are removed. Objects that are obscured by other objects of a higher priority order are removed thereby creating a string of data for a single scan line which is divided by blocks of varying pixel colour level.

Figure 6:
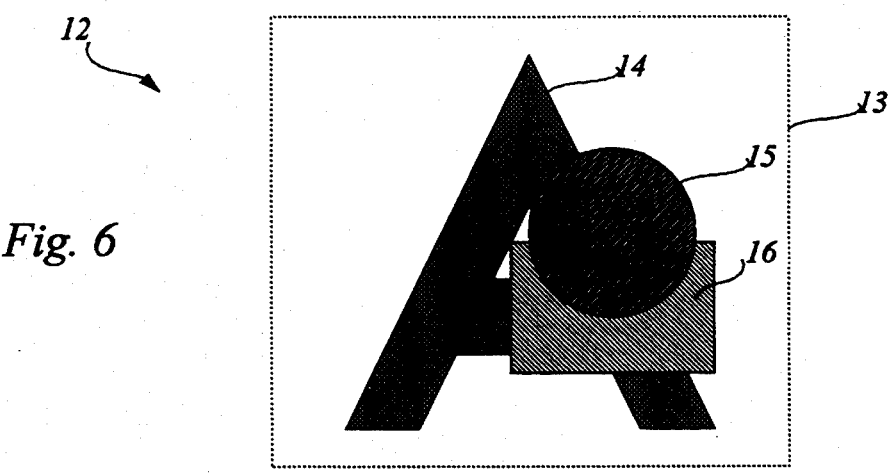
FIG. 6 is a view of the image of FIG. 5.

FIG. 6 shows the resultant image 12 as printed or displayed in which the circle 15 has the highest priority and the background 13 the lowest.

The present invention is concerned specifically with a method and apparatus by which the results of FIGS. 4 and 5 are achieved.

Figure 7:
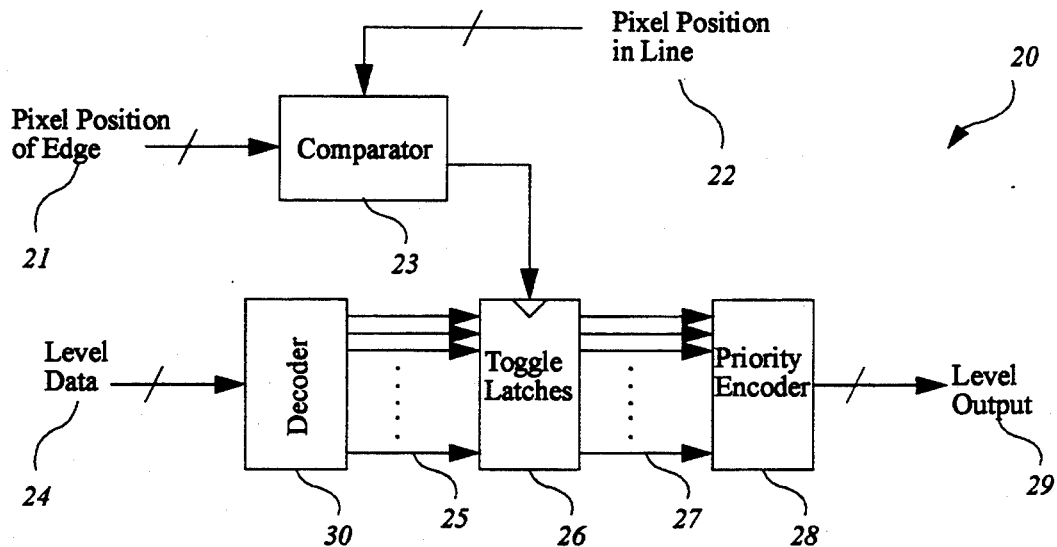
FIG. 7 is a simple embodiment of the present invention.

Referring now to FIG. 7, a fill calculator 20 is shown which receives pixel edge position data 21 and colour level data 24 from an edge calculator 7 such as that seen in FIG. 1. A further input relating to the pixel position in the raster line 22 arrives synchronously from the display, such as the display 10 in FIG. 1, such that pixel data can be output in a synchronous fashion thereto. The level data 24 for each edge is fully decoded using a decoder 30 to output individual bit level data 25 to the inputs of a plurality of toggle latches 26, one latch for each value of decoded level data 25.

A comparator 23 is provided to compare the pixel edge position 21 with the pixel position in the line 22. If the pixel edge value is negative or if it is less than or equal to the value of the pixel position in the line, the toggle latches 26 are clocked simultaneously. This causes the toggle latch corresponding to the particular object's level to toggle, whilst all the other latches remain unaffected. This implements the even/odd rule as previously stated. The outputs of the toggle latches 26 correspond to all of the currently active objects in the display. This operation is equivalent to the level fill provided in FIG. 4.

A priority encoder 28 connects to the output of the toggle latches 26 and selects the highest level output that is asserted. This is then encoded and output as the fill level 29. Accordingly, the priority encoder 28 performs hidden surface removal as seen in FIG. 5. For example, if the priority level of the just clocked level, is less than that being output by the priority encoder 28, the colour level output 29 remains unchanged. Alternatively, if the just clocked level is higher than that being output by the priority encoder, the level output 29 is changed to that of the just clocked level. Also, if the just clocked level is the same as the current highest priority level, the output will change to the highest active level below the current level. This causes the output image to change in accordance with the transition of an edge between two objects in which it is intended that the second object have higher priority and overlie the first. The output level data 29 is then used to select a colour which is displayed in the pixel position in the raster line on the display.

Figure 8:
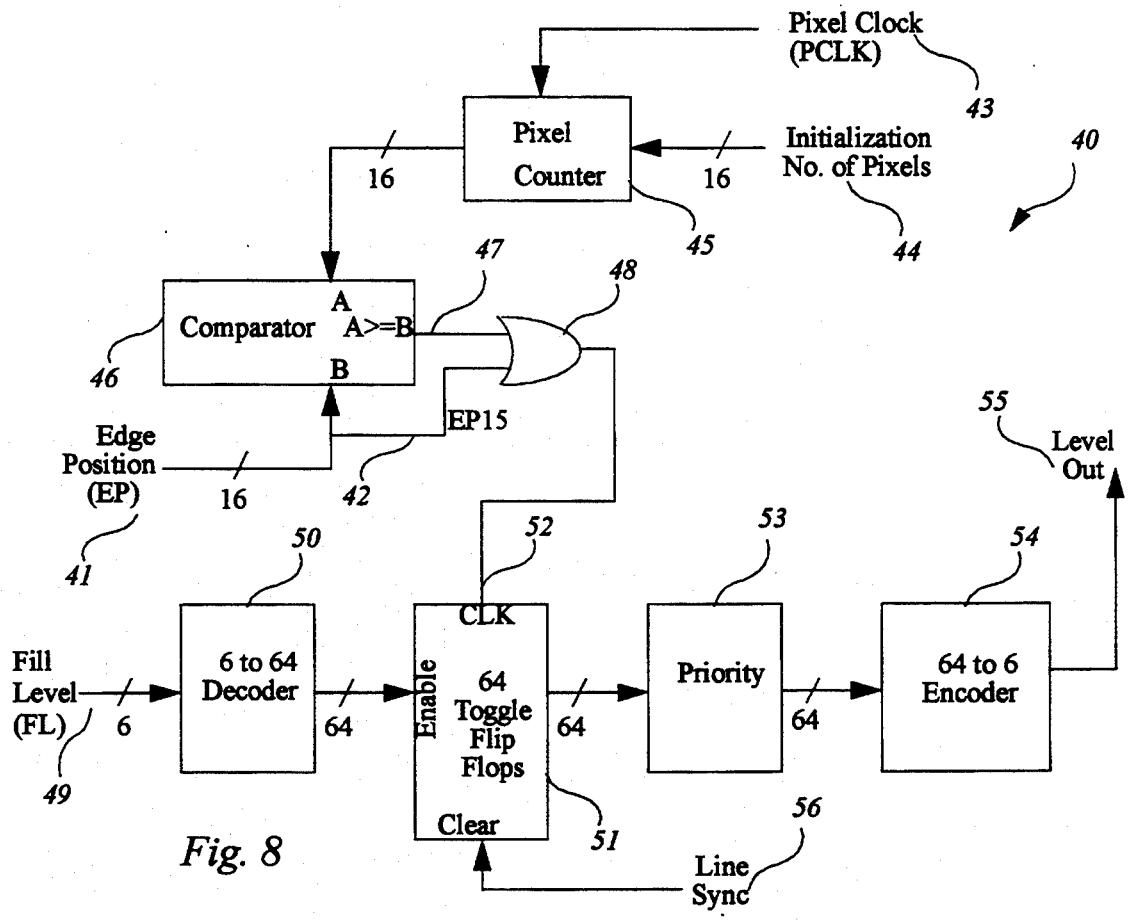
FIG. 8 is a preferred embodiment configured for use in an object based graphic system.

Referring now to FIG. 8, the preferred embodiment of a fill calculator 40 is shown in which the pixel position of object edges in the current line are input and comprise 16 bits of edge position data (EP) 41 and 6 bits of fill level (FL) 49. A pixel clock (PCLK) 43 in synchronism with the display, inputs to a pixel counter 45, which, together with an initialised number of pixels 44, output from the pixel counter 45 the current pixel position in the present raster line which is input to an "A" input of a comparator 46. The edge position data (EP) 41 is provided to a "B" input of the comparator 46 which has an output 47 connected to one input of a NOR gate 48. The NOR gate 48 is also input with the most significant bit (EP15) 42 of the pixel data 41. The NOR gate 48 outputs to a clock input 52 of a bank of 64 J-K flip-flops 51 connected as toggle latches. Each of the flip-flops 51 is enabled with a single decoded fill level 49 supplied via a 6-to-64 decoder 50. When the flip-flops 51 are clocked via the clock input 52, those flip-flops corresponding to enabled levels change state (toggle) to implement the even/odd rule. The toggle flip-flops 51 are reset at the beginning of each line by a line sync 56. The output of the toggle flip-flops 51 are connected to a priority circuit 53, which only allows the highest of the 64 input states to be represented on its output states. This "highest state" is then encoded into a 6-bit binary number by the encoder 54, providing the output level 55.

The output level data 55 can then be input to a colour look-up table (not illustrated but known in the art) to output a 24-bit block of actual colour data for the pixel being displayed.

The fill calculators of FIGS. 7 and 8 provide a means by which a result equivalent to painter's algorithm can be achieved without incurring the necessary expense and time loss found with a full page store. In the specific implementations as described in the aforementioned U.S. patent application Ser. No. 08/053,373, the graphic objects are processed as quadratic polynomial fragments which, in view of their simpler mathematical representation when compared to (Bezier) spline based object data, permit rapid processing up to and including edge calculation 7. However, the present invention is not limited to graphics systems which operate on quadratic polynomial fragments.

The foregoing describes a number of embodiments of the present invention, and modifications obvious to those skilled in the art can be made thereto without departing from the scope of the present invention.

We claim:

1. A method of filling an object based rasterized image comprising a plurality of graphic objects, said method comprising the steps of:

comparing a pixel position in a raster line with pixel edge intersection data of the plurality of graphic objects to determine if an edge exists at said pixel position;

comparing a next pixel position with the pixel edge intersection data of the plurality of graphic objects in the case no edge exists at said pixel position along the raster line while maintaining a currently displayed pixel fill level;

selecting, in the case an edge exists at either said pixel position or said next pixel position, fill level data for each possible one of said plurality of graphic objects to be represented by said pixel;

determining a priority fill level of each of said plurality of graphic objects based on the selected fill level data; and displaying the fill level data corresponding to the highest priority fill level of said plurality of graphic objects as the current pixel fill level.

2. A method as claimed in claim 1 wherein said edge intersection date is derived from processing objects described by quadratic polynomial fragments.

3. Apparatus for filling an object based rasterized image comprised of a plurality of graphic objects, said apparatus comprising:

comparator means for comparing a pixel position in a line of said rasterized image with a pixel position of an edge intersection of said plurality of graphic objects to determine if an edge exists at said pixel position;

selector means for selecting, in the case an edge exists at said pixel position, fill level data for each possible one of said plurality of graphic objects able to be represented by said pixel; and a priority encoder means for determining a priority fill level of each of said plurality of graphic objects and for displaying the fill level data corresponding to the highest priority fill level as the current pixel fill level.

4. Apparatus as claimed in claim 3 wherein said toggle means is adapted to receive a toggle reset signal, said signal is activated at least once per input line of the rasterized image.

5. Apparatus as claimed in claim 3 further comprising:

decoder means adapted to receive an encoded fill signal and to output a corresponding fill level value to said toggle means, and encoder means adapted to receive said priority output level and output a corresponding encoded priority output level.

6. Apparatus as claimed in claim 3 wherein said selector means includes a toggle latch for each fill level.

7. Apparatus as claimed in claim 6 wherein said toggle latch alternates between a first state and a second state upon each occurrence of an edge.

8. Apparatus as claimed in claim 3 wherein said edge intersection is derived from processing objects described by quadratic polynomial fragments.

9. Apparatus for filling an object based rasterized image, said apparatus comprising:

pixel location means for producing a current pixel value of a pre pixel start value;

comparator means for receiving said values from said pixel location means and edge position values and to output an edge display signal when said edge position value is greater than or equal to said current pixel value or said pre pixel value;

combination means for receiving said edge display signal and a pre edge start signal and to combine said signals to produce a toggle signal;

toggle means for receiving fill level values corresponding to said edge position values to toggle a corresponding fill level state from a first state to a second state; and priority determination means for receiving said fill level states from said toggle means and to produce a priority output level corresponding to the highest fill level in said second state.

* * * * *

UNITED STATES PATENT AND TRADEMARK OFFICE
CERTIFICATE OF CORRECTION

PATENT NO. : 5,420,966

DATED : May 30, 1995

INVENTOR : Kia Silverbrook

It is certified that error appears in the above-identified patent and that said Letters Patent is hereby corrected as shown below:

On title page,

Under [73] Assignees, "Canon Information Systems Canon Kabushiki Kaisha" should read --Canon Kabushiki Kaisha-- and "Research Australia Pty Limited" should read --Canon Information Systems Research Australia Pty Limited--.

COLUMN 2

Line 51, "dam" should read --data--.

COLUMN 4

Line 57, "painter's" should read --Painter's--.

COLUMN 5

Line 29, "date" should read --data--.

Signed and Sealed this

Thirty-first Day of October 1995

Attest:

BRUCE LEHMAN

*Attesting Officer*       Commissioner of Patents and Trademarks